(12) United States Patent
Herbert et al.

(10) Patent No.: US 7,707,872 B2
(45) Date of Patent: May 4, 2010

(54) METHOD FOR TESTING A HYDRAULIC MANIFOLD

(75) Inventors: David E. Herbert, Rochester Hills, MI (US); David R. Sosnowski, Lake Orion, MI (US)

(73) Assignee: Eaton Corporation, Cleveland, OH (US)

( * ) Notice: Subject to any disclaimer, the term of this patent is extended or adjusted under 35 U.S.C. 154(b) by 359 days.

(21) Appl. No.: 11/526,493

(22) Filed: Sep. 25, 2006

(65) Prior Publication Data

US 2008/0072657 A1 Mar. 27, 2008

(51) Int. Cl.
*G01M 3/02* (2006.01)
(52) U.S. Cl. ....................................... 73/49.7
(58) Field of Classification Search ............ 73/37, 73/40, 49.1, 49.2, 49.7
See application file for complete search history.

(56) References Cited

U.S. PATENT DOCUMENTS

| | | | | |
|---|---|---|---|---|
| 3,327,554 A | * | 6/1967 | Searles | 477/118 |
| 4,480,462 A | * | 11/1984 | Miller | 73/37 |
| 4,480,464 A | * | 11/1984 | Whisenand et al. | 73/40 |
| 5,423,183 A | * | 6/1995 | Folsom | 60/492 |
| 6,138,923 A | * | 10/2000 | Nakano et al. | 239/88 |
| 6,289,259 B1 | * | 9/2001 | Choi et al. | 700/197 |
| 6,626,036 B2 | * | 9/2003 | Milender et al. | 73/168 |
| 6,929,031 B2 | | 8/2005 | Ford et al. | |
| 2004/0187942 A1 | | 9/2004 | Ford et al. | |
| 2006/0032541 A1 | | 2/2006 | Ford et al. | |
| 2008/0223111 A1 | * | 9/2008 | Mc Donald et al. | 73/37 |

* cited by examiner

*Primary Examiner*—John Fitzgerald
(74) *Attorney, Agent, or Firm*—Rader, Fishman & Grauer PLLC (57) ABSTRACT

A manufacturing process, system, and method is described that facilitates the assembly and testing of a hydraulic manifold with integral closed loop pressure sensing and feedback.

24 Claims, 10 Drawing Sheets

METHOD FOR TESTING A HYDRAULIC MANIFOLD

TECHNICAL FIELD

Described herein is a manufacturing process, system, and method, which facilitates the assembly and testing of a hydraulic manifold.

BACKGROUND

Electro-hydraulic manifold assemblies having a plurality of solenoid operated valves disposed on a manifold block, each operable to control pressure from the inlet to a separate outlet, are used in many industries. Sensing ports are provided in each outlet with a pressure sensor sealed over the sensing port for providing a signal indicative of the sensed pressure. The pressure sensors are mounted on a lead frame and connected to conductive strips in the lead frame. The lead frame has slots therein, which permit the frame to be simultaneously electrically connected by bayonet connection to the terminals on each solenoid valve as the transducers are sealed over the sensing ports and the lead frame attached to the manifold block.

Manifolds of this type are employed for controlling pressure of hydraulic fluid in servo-actuators as, for example, clutch actuators in automatic speed-change power transmissions for motor vehicles where it is desired to control the speed change or shifting patterns of the transmission with an electronic controller. This arrangement has found widespread use in modern automatic vehicle transmissions because the electronic controller can receive in real time multiple inputs of vehicle operating parameters such as road speed, throttle position and engine RPM; and the electronic controller can be programmed to provide optimum shifting patterns based upon known engine power available, vehicle mass and the operating parameter inputs.

In providing a shifting pattern for controlling hydraulic fluid pressure to each of the transmission speed change clutch actuators for effecting the desired shifting, it has been found that providing pressure sensors at the outlet of each of the electrically operated valves can provide a clutch actuator pressure signal in real time, which is in actuality an analog of the force on the clutch that is in turn proportional to the torque transmitted by the clutch during engagement and disengagement. Such an arrangement provides an electrical signal proportional to torque transmitted for a particular gear set and thus provides real time closed loop control of the transmission shifting. This arrangement has been found desirable as an alternative to predetermined shifting algorithms for open loop shift control by the electronic controller.

Electrically connecting the plurality of pressure sensors to the solenoid operated valves in a transmission shift control module or manifold assembly in a manner, which is simple and easy to install in mass production and yet is sufficiently low in cost, gives rise to a need for a novel, low cost method for assembling and testing the hydraulic manifold. The assembly and testing of the hydraulic manifold includes providing at least one component to be assembled and tested from a component group that has at least one: electro-hydraulic proportional valve, electro-hydraulic "on/off" valve, sensor for providing at least one feedback signal, retention component, and optional microprocessor/control unit.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

The term "valve" or any variation thereof as used throughout the specification is defined hereinafter to include but is not limited to: any of various devices that regulate the flow of fluids such as gases, liquids, or loose particles through piping or through apertures by opening, closing, or obstructing ports or passageways; and any of various mechanical or electrical devices by which the flow of a fluid may be started, stopped, or regulated by a movable part that opens, shuts, or partially obstructs one or more ports or passageways. The term "manifold" or any variation thereof as used throughout the specification is defined hereinafter to include but is not limited to: a component for operating several devices of any kind at generally the same time. The term "sensor" or any variation thereof as used throughout the specification is defined hereinafter to include but is not limited to: a device that receives and responds to a signal or stimulus; and any device that receives a signal or stimulus (e.g. as heat or pressure or light or motion) and responds to it in a distinctive manner. The term "pressure" or any variation thereof as used throughout the specification is defined hereinafter to include but is not limited to: the force applied to a unit of area or volume; measured in pascals (SI unit) or in dynes (cgs unit) or in pounds per square inch. The term "hydraulic" or any variation thereof as used throughout the specification is defined hereinafter to include, but is not limited to: of, involving, moved by, or operated by, a fluid under pressure. The term "data" or any variation thereof as used throughout the specification is defined hereinafter to include but is not limited to: factual information, especially information organized for analysis or used to reason or make decisions; values derived from scientific experiments; and numerical or other information represented in a form suitable for processing by computer. The term "pump" or any variation thereof as used throughout the specification is defined hereinafter to include but is not limited to: a machine or device for raising, compressing, or transferring fluids.

Referring to FIGS. 1 through 5, one embodiment of a hydraulic manifold is indicated generally at 10 and includes a manifold block 12, an electrical interface 14, and a plurality of solenoid operated valves 16, 18, 20, 22, 24, 26, 28, 30. Although these figures show a lead frame as the interface 14, the interface 14 can be any structure that distributes communication signals and power, such as fiber optic cables, plated traces, flexible circuits, wire harnesses, wireless interfaces, etc., as will be described in greater detail below.

The interface 14 includes a plurality of pressure sensors or transducers 32, 34, 36, 38, 40, each having leads secured or attached to electrically conductive pads denoted respectively by the primed reference numeral for each of the transducers. Integral to each sensor 32, 34, 36, 38, 40 is an Application Specific Integrated Circuit (ASIC). This ASIC performs two major functions: a) Raw sensor signals are conditioned prior to transmission to the TCU and b) calibration data for each sensor die is permanently stored in the ASIC's internal memory for retrieval at a later time as required. This sensor calibration data is most likely obtained and immediately stored in the ASIC by the sensor supplier during test at supplier's facility. Alternately, a single ASIC may be multiplexed with the plurality of sensors if lead frame packaging constraints permit.

Figure 1:
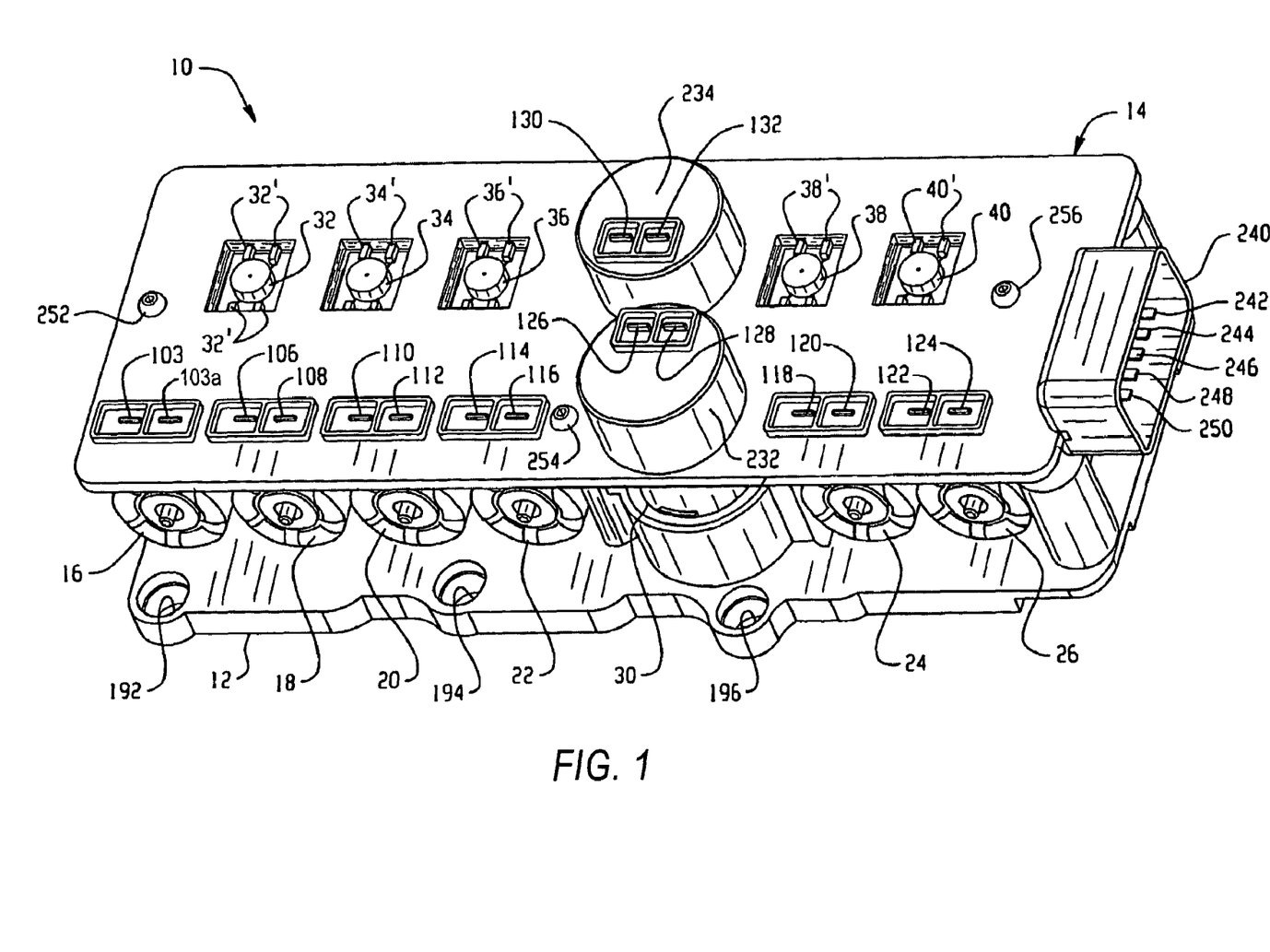
FIG. 1 is a perspective view of a first embodiment of an assembled manifold block, valve, pressure sensors, and electrical interface.
Figure 2A:
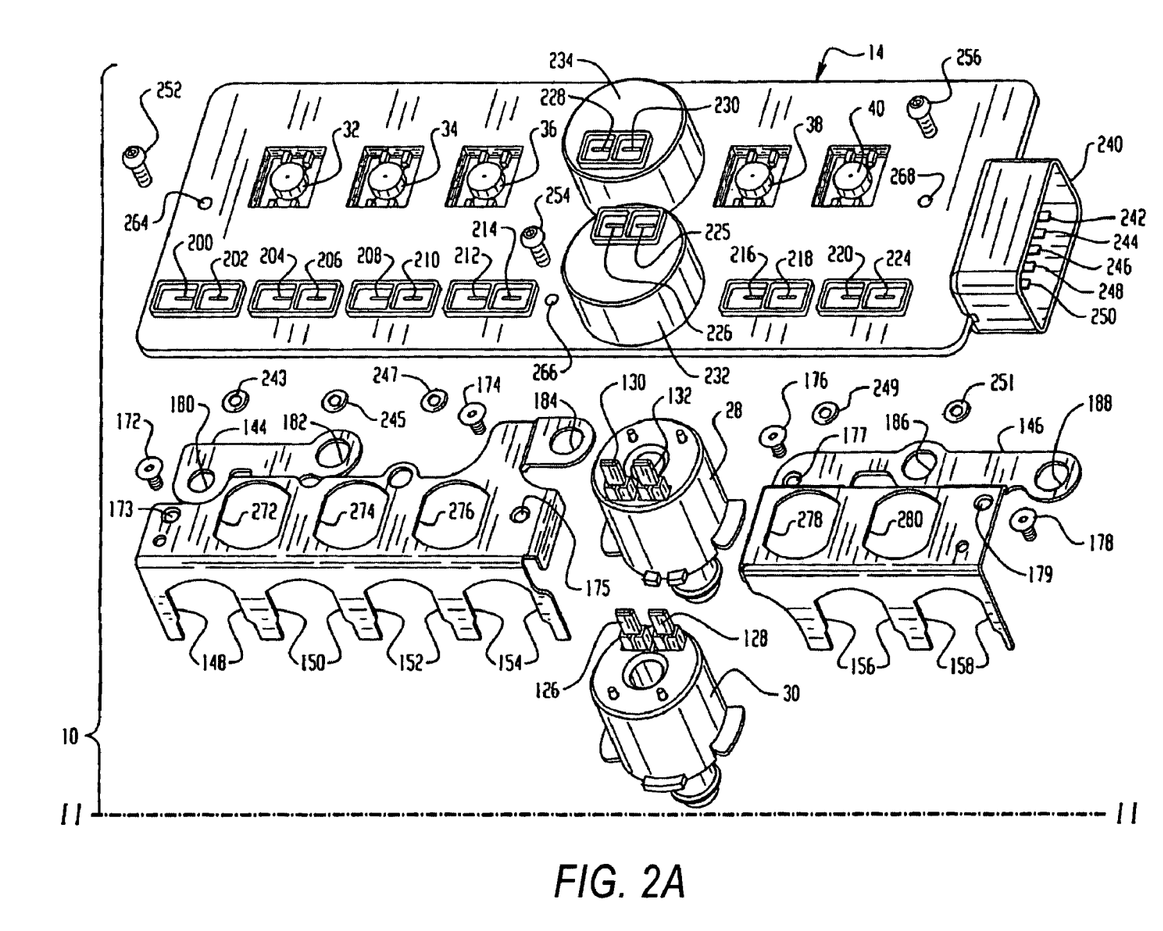
FIGS. 2A and 2B are a single exploded view of the assembly of FIG. 1 divided along separation line 11-11.
Figure 2B:
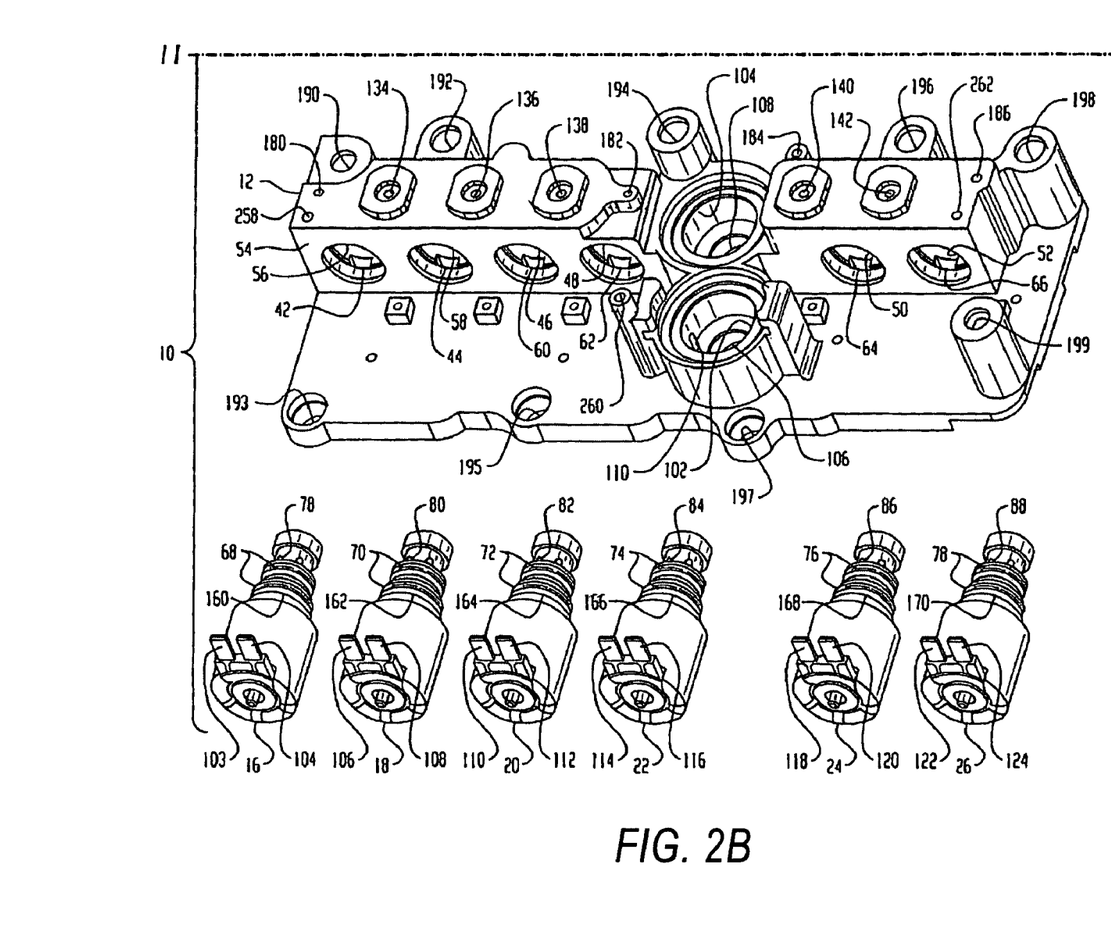
Figure 3:
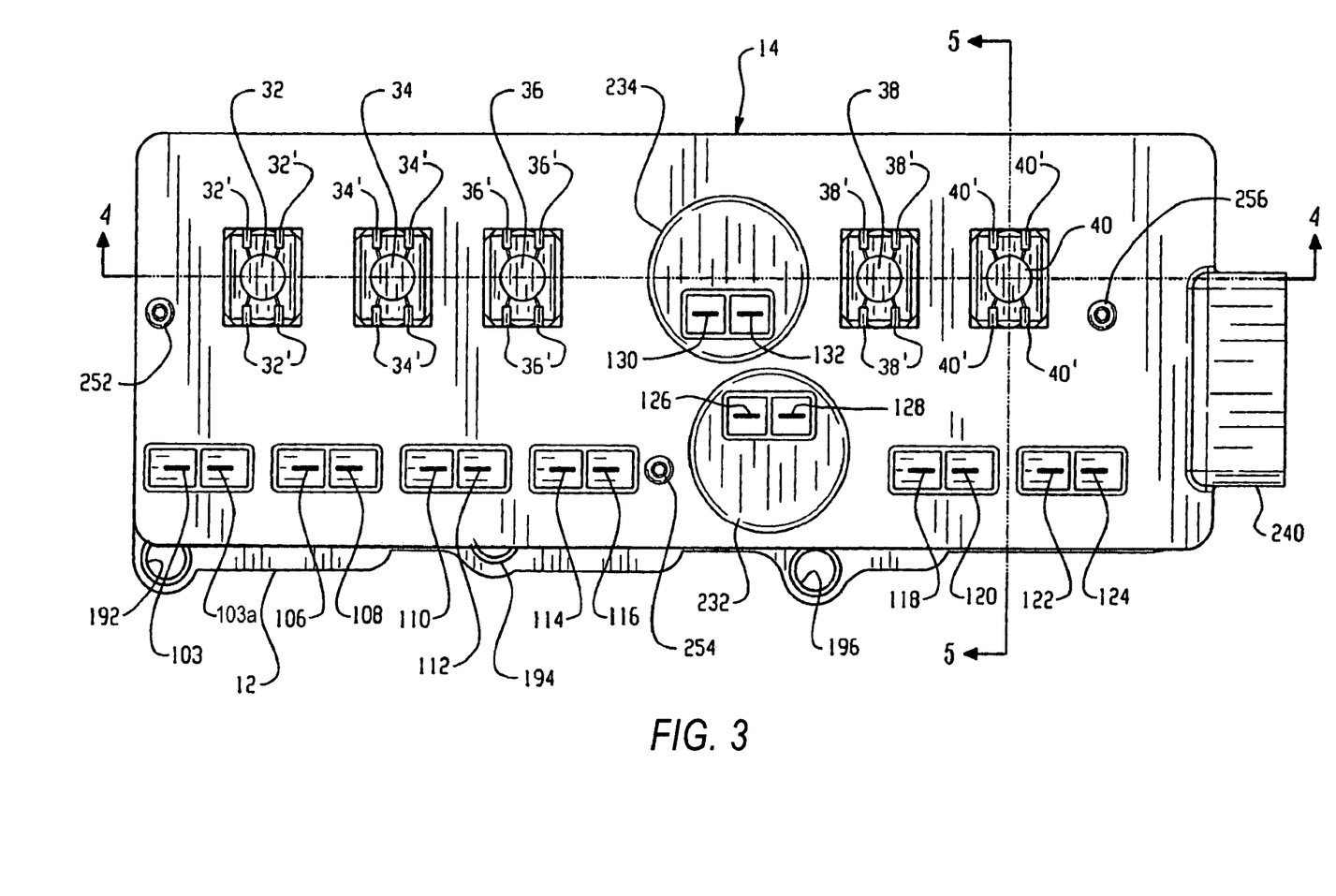
FIG. 3 is a plan view of the assembly of FIG. 1.

As illustrated in FIG. 2B the manifold block 12 includes a plurality of valving cavities 42, 44, 46, 48, 50, 52, formed horizontally in the vertically extending side 54 of the manifold block 12, with each of the valving cavities having an outlet passage denoted respectively 56, 58, 60, 62, 64, 66, which are connected (not shown) to the underside of the block and are adapted to connect with corresponding hydraulic passages in the device to be controlled such as the control pressure passages in an automatic transmission valve body for shifting clutch actuation.

Each of the valves 16 through 26 has an outlet passage (not shown) formed thereon between a pair of O-ring seals provided on the valve as denoted by reference numerals 68, 70, 72, 74, 76, 78 in FIG. 2B. An inlet passage (not shown) formed through the valve block communicates with an inlet 90, 92, 94, 96, 98, 100 (see FIG. 4) respectively in the bottom of each of the valving chambers 42, 44, 46, 48, 50, 52 and provides pressurized fluid to the inlets at each of the solenoid valves denoted respectively 78, 80, 82, 84, 86, 88 in FIG. 2B.

Referring to FIGS. 2A and 2B, a pair of auxiliary valve chambers 102, 104 is formed in a horizontally extending upper face of the manifold 12; and, each has an inlet passage respectively 106, 108 formed in the bottom thereof. An outlet port is formed in the side of each of chamber 102, 104 thereof for providing flow to auxiliary functions in the transmission with one of the outlets visible in FIG. 2B and denoted by reference numeral 110. Solenoid operated valves 28, 30 are disposed in the chambers 102, 104 respectively.

Each of the valves 16 through 26 and 28, 30 has a pair of electrical connector terminals denoted respectively 103 through 132 extending in an upward direction therefrom for connection thereto as will hereinafter be described.

Block 12 has a plurality of spaced sensing ports provided on the upper surface thereof and denoted respectively by reference numerals 134, 136, 138, 140, 142; and, each of the ports 134 through 142 may be connected internally within the block to one of the outlet passages 56 through 66 respectively by intermediate passages (not shown) within the block. Alternatively, ports 134-142 may be connected to passages in the transmission valve body.

Figure 4:
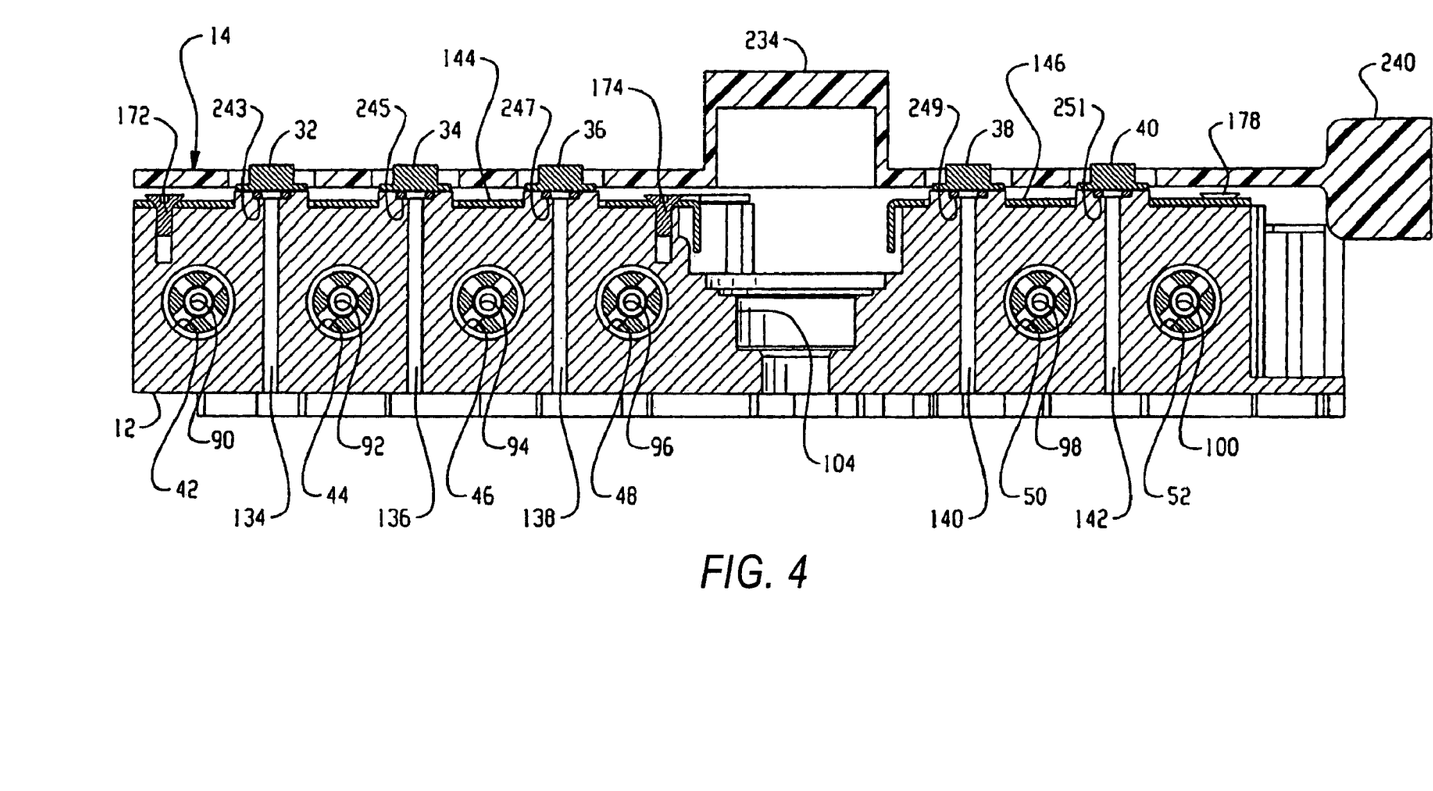
FIG. 4 is a cross-sectional view taken along section line 4-4 of FIG. 3.

Referring to FIGS. 2A and 4, a pair of brackets having a generally right angle configuration denoted by reference numerals 144, 146 are provided with bifurcations or slots respectively 148 through 158 and are received over grooves denoted respectively 160 through 170 on the solenoid valves 16 through 26 respectively as shown in FIG. 2B for retaining the valves in their respective valving cavities. Brackets 144, 146 are retained on the manifold block 12 by retaining bolts, screws, or other fastening mechanisms 172, 174, 176, 178 through apertures 173, 175, 177, 179 in the brackets and which threadedly engage tapped holes 180, 182, 184, 186 provided in the upper surface of the block 12.

The brackets 144, 146 additionally have apertures 180, 182, 184, 186, 188 respectively formed therein which coincide with retaining fastener holes 190, 192, 194, 196, 198 provided in the manifold block for retaining bolts, screws, or other retaining mechanisms (not shown) to pass therethrough for connection to a transmission housing. Similarly, manifold block 12 has additional holes 193, 195, 197, 199 for receiving bolts, screws, or other retaining mechanisms therethrough for attachment to a transmission deck.

Referring to FIGS. 1, 2A, 3, 4, and 5, the interface 14 has a plurality of slots 200 through 224 formed therein in pairs in spaced arrangements and located on the interface so as to be positioned for connection to electrical terminals 103 through 124 of valves 16 through 26 respectively. A second set of slots 225 through 230 is provided on the top of raised portions 232, 234 formed in the interface to accommodate the vertically extending valves 28, 30, and, slots 225 through 230 are positioned so as to each be located directly above one of the electrical terminals 126 through 132 respectively.

The interface 14 has an electrical receptacle portion 240 formed on one end thereof that has a plurality of electrical connector pins provided therein, five of which are shown and denoted by reference numerals 242 through 250 in the drawings. It will be understood that the electrical terminals such as terminals 242 through 250 are respectively connected to conductive strips (not shown) extending within the frame 14 and which are each connected respectively to one of the pads such as 32', 34', 36', 38', 40' and also to unshown strips, which have portions thereof exposed in the slots 200 through 224 and slots 226 through 230. Thus, the entire interface 14 in this embodiment is received over the manifold block 12 and simultaneous electrical connection is made with the terminals 103 through 132. The interface 14 is then secured to the block 12 by retaining bolts, screws, or other retaining mechanisms 252, 254, 256. Note that separate fasteners are not necessarily needed to secure the interface 14 to the block 12; for example, the interface may be attached directly to the block 12.

Figure 5:
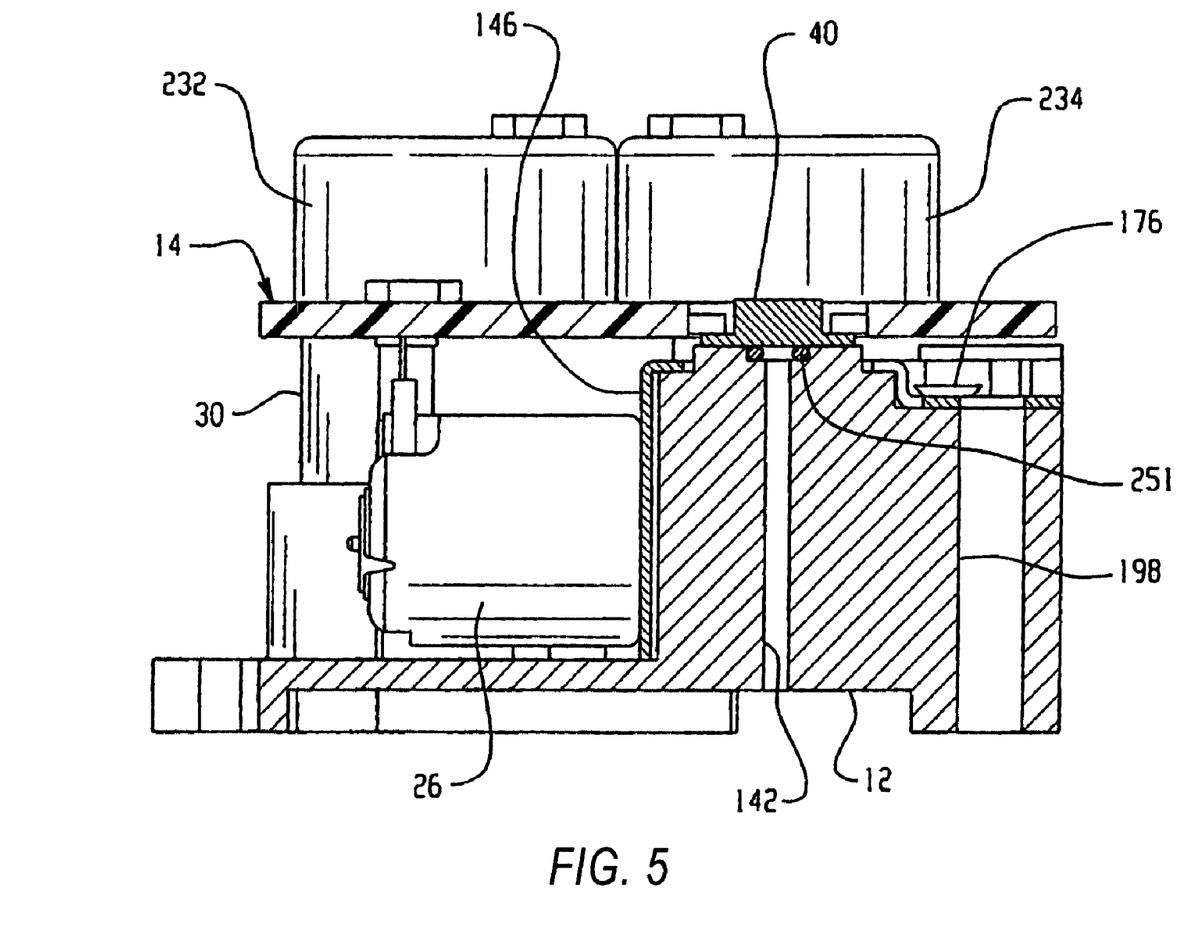
FIG. 5 is a cross-sectional view taken along section line 5-5 of FIG. 3.

Referring to FIGS. 2A, 4, and 5, a plurality of O-rings denoted respectively 243, 245, 247, 249, 251 are disposed respectively each in a counter bore or annular groove formed at the top of each of the sensing ports 134 through 142 and provide for sealing about the upper end of the port with the undersurface of the respective pressure transducer 32 through 40 associated therewith. The O-rings are pre-placed in the counter bores and are each sealed respectively against the undersurface of one of the sensors 32 through 40.

Referring to FIG. 2A, it will be apparent that brackets 144 and 146 have clearance apertures denoted respectively 272, 274, 276 and 278, 280 formed therein to provide clearance about the sensing ports 134 through 142 for the pressure sensors 32 through 40 to extend upwardly through the brackets.

Figure 6:
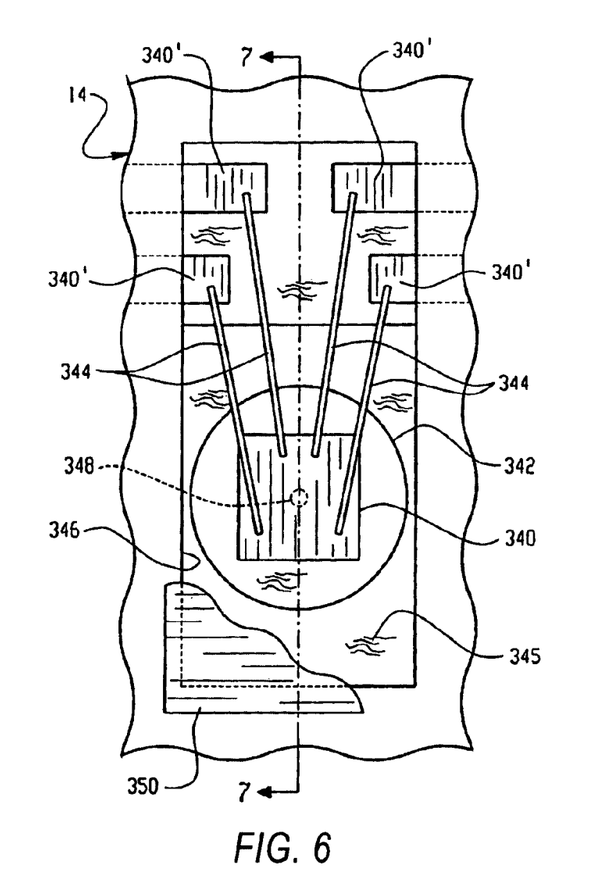
FIG. 6 is an enlarged view of a portion of FIG. 3 showing an alternative embodiment of the pressure sensor arrangement.
Figure 7:
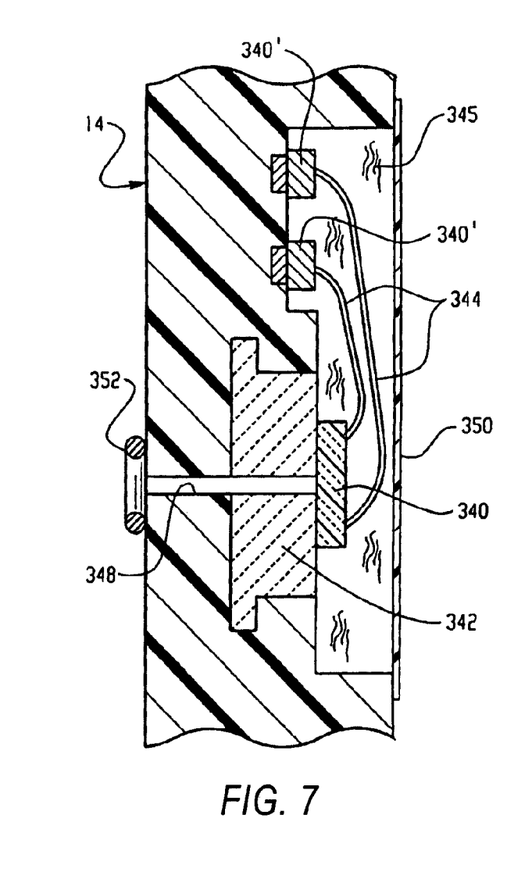
FIG. 7 is a cross-sectional view taken along section line 7-7 of FIG. 6.

Referring to FIGS. 6 and 7, one possible arrangement or embodiment for mounting of a typical solid state pressure sensor die 340 is illustrated, wherein the die is mounted on a ceramic disk 342 with leads 344 extending from the die for attachment to exposed pads 340' provided at the ends of the conductors, shown in interrupted outline in FIG. 6, which are embedded in the interface 14. Die 340 is bonded such as by the use of epoxy resin or other suitable adherent to the ceramic disk. The lead wires 344 from the die are then attached one each to the pads 340' respectively by any suitable expedient such as weldment. A recessed cavity 346 provided in the interface 14 surrounding the die 340 is then filled with a suitable potting agent 345 as, for example, silicone gel, to protect the electrical connections. The recessed cavity as filled with the silicone gel may then be sealed with a suitable plastic cover 350 for further protection. It will be understood that the pressure signal enters through a suitable aperture or sensing hole 348 to apply the sensed pressure to the undersurface of the die 340. The disk 342 is sealed over the manifold sensing port by a suitable resilient seal ring 352. It will be understood that the sealing for the pressure sensor and the sensing port of the manifold for the embodiment of FIGS. 6 and 7 is accomplished in the same manner as that for the embodiment 10 of FIGS. 1 through 5.

Figure 8:
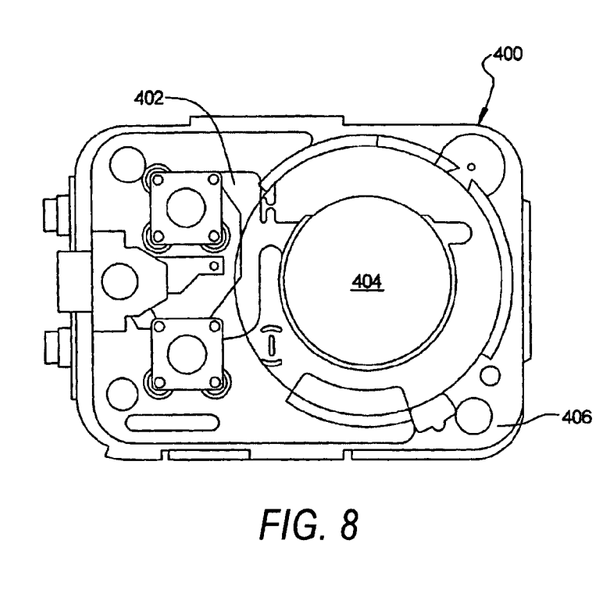
FIG. 8 is a plan view of a first exemplary electrical interface.
Figure 9:
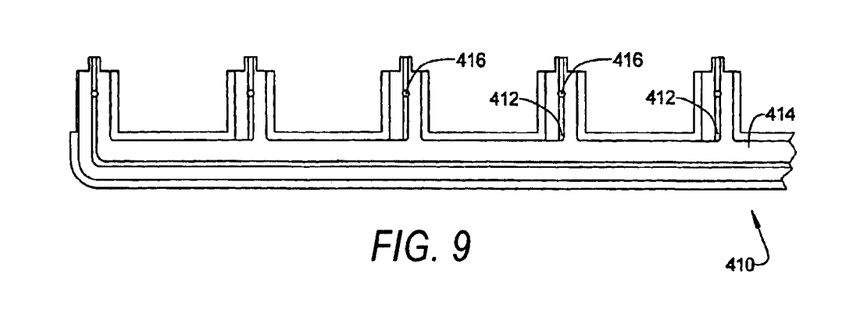
FIG. 9 is a plan view of a second exemplary interface.

FIGS. 8 and 9 show possible alternative structures that may be used for the interface 14. Those of ordinary skill in the art will understand how these alternative interfaces 14 may be incorporated into the inventive system 10. FIG. 8 shows an example of a plated trace 400 that includes a conductive trace 402 and a conductive mounting area 404 applied to a non-conductive base 406, such as a polymer base. The conductive mounting area 404 is used to mount a pressure transducer and interconnect to a transmission control unit (TCU). Applying the plated trace 400 to the base 406 allows attachment of the pressure transducer to the manifold 12.

FIG. 9 shows an example of a flex circuit 410 that may be used as the interface 14. The flex circuit 410 would be mounted to the manifold 12 to allow interconnection of pressure transducer assemblies in the system 10. The flex circuit 410 includes a plurality of branches 412 that extend from a main line 414. Each branch 412 may include a hole 416 for connecting the flex circuit 410 to electrical connector pins via any known manner.

Figure 10:
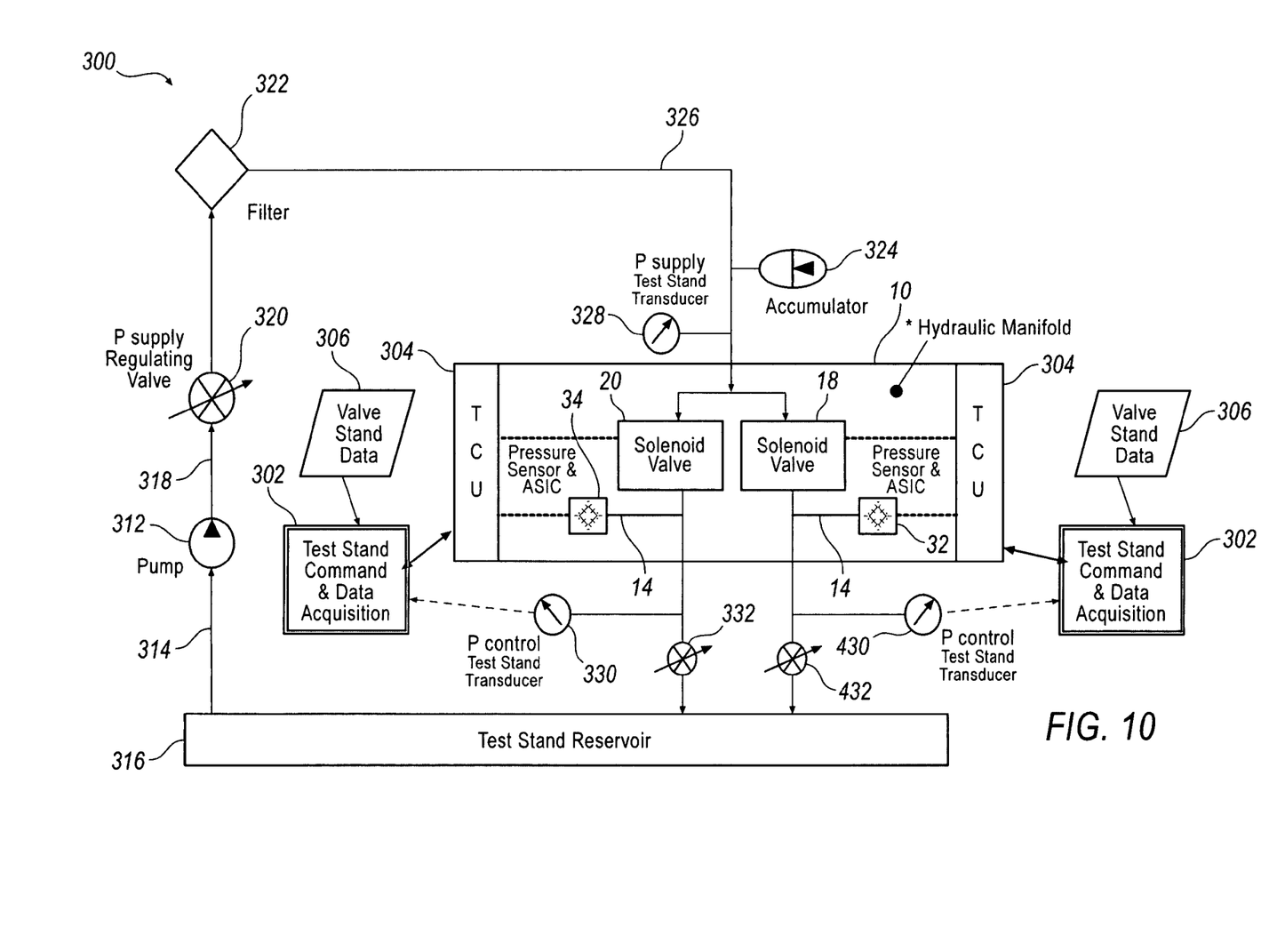
FIG. 10 is a schematic illustrating one embodiment of a test stand set-up for testing a hydraulic manifold showing the testing of two valves for simplicity.

FIG. 10 is a schematic representation of one embodiment of a closed-loop test stand 300 for testing the hydraulic manifold 10 of FIGS. 1-9. The test stand 300 may also be a calibration stand and the like. The test stand 300 includes a test stand command & data acquisition portion 302 in communication with at least one Transmission Control Unit 304 (TCU). The test stand command & data acquisition portion 302 may be a program within the TCU 304 or more likely may be a separate component such as an application specific module or a computer. The test stand command & data acquisition portion 302 includes at least predetermined solenoid valve data 306 for comparison against the hydraulic manifold 10 output. The data 306 are solenoid valve performance data that have been previously obtained under predetermined conditions. In one example, for testing purposes, the data 306 represent desirable solenoid transfer function data at 20° Celsius. In another example, the data 306 represent solenoid transfer function data at 70° Celsius. The data 306 may be acquired on a separate solenoid valve test stand. Once the complete manifold assembly is tested at this location, solenoid valve data 306 from the two test stands may be correlated and compared to assure quality and reduce overall test cycle time. Further, the data 306 may be obtained in any manner including the test stand 300, a calibration stand (not shown), or any information gathering apparatus at any time before, during, and after the manufacturing process.

The TCU 304 is a device that controls an electronic automatic transmission (not shown). Pressure sensors or transducers 32, 34, 36, 38, 40 of FIG. 1 as well as data provided by the Engine Control Unit (not shown) is used to calculate how and when to change gears in a vehicle (not shown) for optimum performance, fuel economy, and shift quality. For simplicity, two pressure sensors 32, 34 are illustrated in FIG. 10 in communication with an Application-Specific Integrated Circuit (ASIC) of an electrical interface 14 for monitoring the solenoid valves 18, 20. On vehicles where shifting of the automatic transmission is controlled by the TCU 304: manifold vacuum, engine operating temperature, gear selection, throttle position, and other factors are communicated to the TCU 304. The TCU 304 produces output signals that activate the electrical connector terminals denoted respectively 103 through 132 of FIG. 1, which in turn, operate the solenoid valves 18 through 26. For simplicity, solenoid valves 18 and 20 are illustrated in FIG. 10.

In an exemplary embodiment, the test stand 300 includes a flow of fluid moved by a fluid pump 312. The pump 312 includes an inlet portion, generally at 314, adapted to receive the fluid from a reservoir 316 and an outlet portion, generally at 318, adapted to move fluid toward the solenoid valves 18, 20. The purpose of the pump 312 is to create fluid flow and pressure within at least a portion of the test stand 300. The outlet pressure of the pump 312 is controlled by a pressure regulating valve 320.

The fluid is moved through a filter 322 to a hydraulic accumulator 324. The hydraulic accumulator 324 is an energy storage device various types of which are well known in industry.

The accumulator 324 is placed proximate the pump 312 with a non-return valve (not shown) preventing flow back to it. In the case of a piston-type pump, the accumulator 324 absorbs pulsations of energy from the pump 312 and protects the system from fluid hammer. This protects test stand 300 components from potentially destructive forces. A supply transducer 328 measures the fluid pressure supplied to the manifold 10 inlet port.

The TCU 304 controls the fluid pressure provided by the solenoid valves 18, 20 for the purpose of testing the hydraulic manifold 10. The output fluid pressure from the solenoid valves 18, 20 is measured by a pressure control transducers 330 and 430. This pressure data is uploaded to the test stand command & data acquisition portion 302 of the test stand 300 for comparison with previously obtained data. The output fluid from each solenoid valve 18, 20 is regulated at output regulating valves 332 and 432 back into the test stand reservoir 316. Sweeping the solenoid valve output pressure also "sweeps" the integral pressure sensors 32 through 40. Therefore, the sensors 32 through 40 may be simultaneously characterized at the same time as valves.

By way of example, two temperatures and three pressures are obtained for calibrating a sensor 32 through 40. Testing may be performed at either twenty degrees Celsius (20° C.) or seventy degrees Celsius (70° C.). The test at twenty degrees Celsius (20° C.) may include a seventy degree Celsius (70° C.) correlation test. A test may be performed in either fluid or compressed air. The compressed air test may include a correlation hydraulic fluid test.

Figure 11:
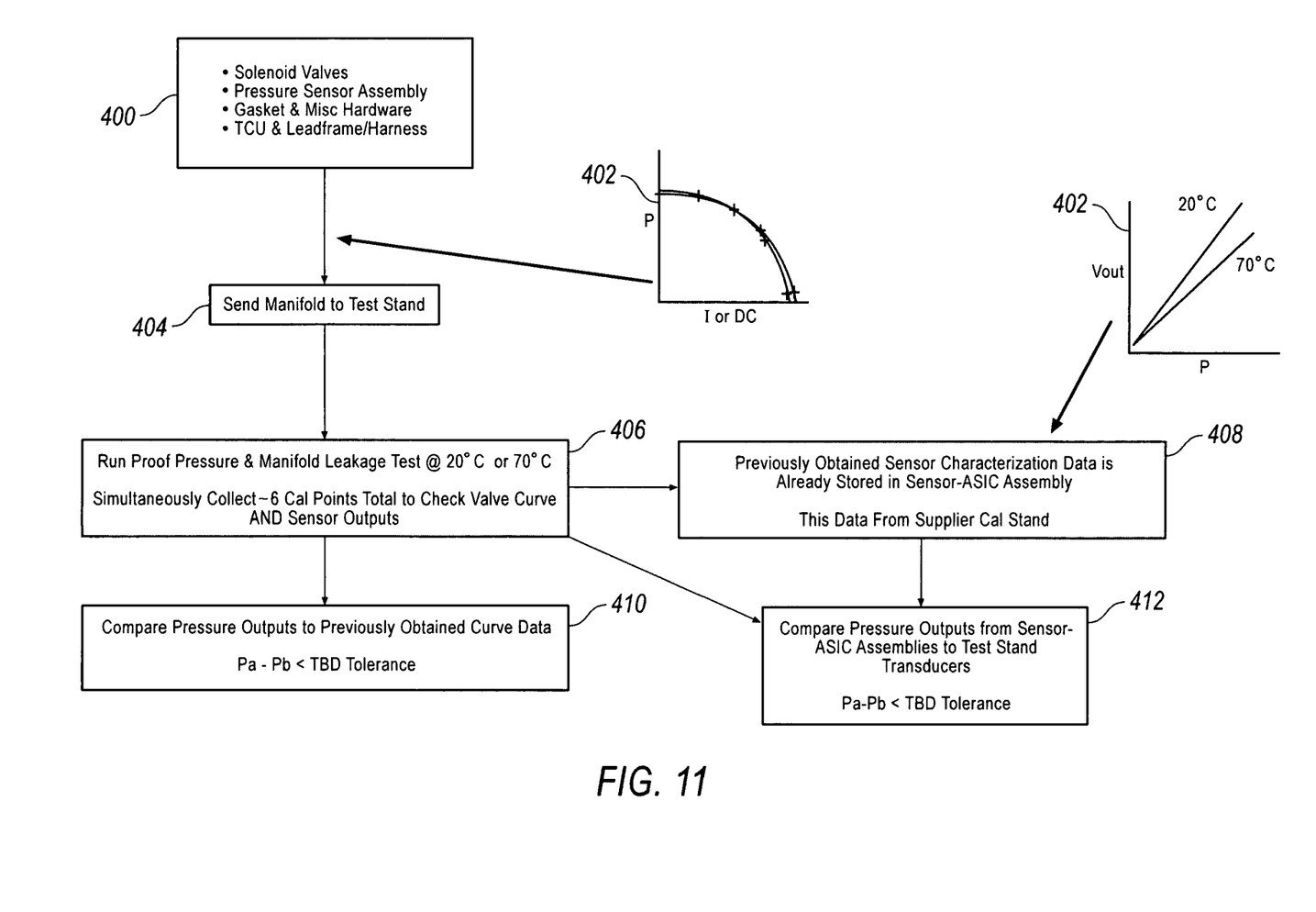
FIG. 11 is a flow chart of the system data flow and verification.

Referring now to FIG. 11, one exemplary testing method is illustrated including the mechanical assembly of the hydraulic manifold, shown generally at 400. The valve stand data 306 described above are located on the test stand command & data acquisition portion 302 of FIG. 10 and may be downloaded during a valve data download step 402. The step of downloading valve data 402 may be performed at any point prior to comparing data results as further discussed below. The valve data are data that characterize the pressure of the valves to the desired output voltage/current/frequency. The assembled manifold is moved to the test stand at moving step 404. The hydraulic manifold 10 is then tested for pressure and leakage at a testing step 406 at a predetermined temperature. In one example, the manifold is tested at 20° Celsius or 70° Celsius.

The pressure and leakage testing step 406 includes collecting a plurality of pressure levels and sensor outputs as manifold inlet pressure is increased from zero (0) gage pressure to full normal operating pressure or "proof" pressure as desired. The testing step 406 collects a plurality of calibration points to check the results against a valve curve and sensor outputs. Further, the collected data include measurable data such as leakage of the valves, solenoid function, and pressure sensor function. The pressure level data and sensor output data is uploaded to the test stand command & data acquisition portion 302 of the test stand 300 of FIG. 10 at uploading step 408. Uploading step 408 includes data previously downloaded at download step 402, which includes pressure output at a predetermined temperature from the solenoid valve test stand. Also included is uploading sensor calibration data stored in the ASIC during testing at the sensor supplier. The ASIC data are transmitted from the ASIC through the TCU to the test stand command and data acquisition system. Both the pressure output levels and the sensor outputs are then compared to the already stored valve stand data 306.

The difference between the solenoid valve pressure output from the manifold stand and the solenoid valve pressure data output from the solenoid valve test stand is checked at a comparison step 410. The solenoid valves—manifold assembly is accepted if the difference between an actual manifold test pressure point(s) (Pa) and the solenoid valve test stand pressure point(s) (Pb) is less than the desired tolerance for all the valves.

The difference between the manifold test stand pressure output and the supplier sensor test stand output stored in the ASIC is checked at a comparison step 412. The pressure sensor—manifold assembly is accepted if the difference between manifold test stand pressure point (Pa) and supplier sensor test stand pressure point (Pb) is less than the desired tolerance for the pressure sensor.

The above described manufacturing process includes coordinated data flow from one process step to the next. Therefore, as the calibration of each solenoid valve and pressure sensor is unique, the above manufacturing method provides serialized or sequenced control of all parts either via bar coding, one piece flow or some other method.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A system for testing a manifold having at least one of a solenoid valve and a pressure sensor, the system comprising:
   a reservoir for storing a fluid;
   a pump selectively moving said fluid toward a manifold area;
   a pressure supply transducer arranged downstream of said pump and upstream of said solenoid valve of said manifold; and
   a testing mechanism in communication with said manifold, said testing mechanism having access to predetermined test data.

2. The system of claim 1, further comprising a pressure regulating valve for controlling a pressure of the fluid delivered to said manifold, said pressure regulating valve arranged downstream of said pump and upstream of said pressure transducer.

3. The system of claim 1, further including a pressure regulating valve for controlling a pressure of the fluid delivered to said manifold, said pressure regulating valve arranged downstream of said pump and upstream of said solenoid valve of said manifold.

4. The system of claim 1, further comprising a regulating valve arranged downstream of said solenoid valve of said manifold, the regulating valve operable for regulating said flow of fluid to said reservoir.

5. The system of claim 1, further including a filter disposed between said pump and said manifold.

6. The system of claim 5, further including an accumulator disposed between said filter and said manifold area.

7. The system of claim 1, further comprising a pressure control transducer arranged downstream of said manifold.

8. The system of claim 7, wherein said pressure control transducer operably communicates with said testing mechanism.

9. The system of claim 7, further comprising a regulating valve arranged downstream of said pressure control transducer.

10. The system of claim 1, further including a Transmission Control Unit in communication with said manifold.

11. The system of claim 10, wherein said Transmission Control Unit selectively controls a fluid pressure of said solenoid valve of said manifold.

12. The system of claim 11, further including a data comparison mechanism comparing said pressure with said predetermined test data.

13. The system of claim 11, further including at least one pressure control transducer measuring said pressure.

14. The system of claim 13, wherein said pressure control transducer is arranged downstream of said manifold.

15. The system of claim 14, wherein said pressure control transducer operably communicates with said testing mechanism.

16. A method for testing a manifold having at least one of a solenoid valve and a pressure sensor, the method comprising the steps of:
   providing a reservoir for storing a fluid;
   delivering said fluid to said manifold;
   collecting a plurality of manifold performance test data from said manifold while selectively varying an inlet pressure of said manifold; and
   analyzing said manifold performance test data in connection with previously obtained calibration test data.

17. The method of claim 16, wherein said manifold performance test data includes at least one of valve leakage, solenoid function, and pressure sensor function.

18. The method of claim 16, wherein said manifold performance test data includes a predetermined temperature and at least one of a solenoid valve pressure output and a pressure sensor output.

19. The method of claim 16, further including uploading said manifold performance test data into a testing mechanism in communication with said manifold.

20. The method of claim 16, further including uploading said calibration test data into a testing mechanism.

21. The method of claim 16, wherein a Transmission Control Unit selectively communicates with a testing mechanism, said Transmission Control Unit selectively controls a fluid pressure of said solenoid valve of said manifold.

22. The method of claim 16, further comprising collecting said plurality of manifold performance test data from said manifold at a predetermined temperature.

23. The method of claim 16, wherein said calibration test data includes at least one of a solenoid valve test stand pressure data and a pressure sensor test stand output data.

24. The method of claim 23, wherein said manifold performance test data includes at least one of a solenoid valve pressure output and a pressure sensor output, said method further comprising comparing at least one of said solenoid valve pressure output and said pressure sensor output to at least one of said solenoid valve test stand pressure data and said pressure sensor test stand output data.

* * * * *